(12) United States Patent
Wu et al.

(10) Patent No.: US 10,388,925 B2
(45) Date of Patent: Aug. 20, 2019

(54) BATTERY MODULE

(71) Applicant: CONTEMPORARY AMPEREX TECHNOLOGY CO., LIMITED, Ningde (CN)

(72) Inventors: Anwei Wu, Ningde (CN); Bin Zhao, Ningde (CN); Qiongwei Yao, Ningde (CN); Guangyue Zhong, Ningde (CN); Sichuan Luo, Ningde (CN); Yongcheng Chen, Ningde (CN)

(73) Assignee: CONTEMPORARY AMPEREX TECHNOLOGY CO., LIMITED, Ningde, Fujian Province (CN)

( * ) Notice: Subject to any disclaimer, the term of this patent is extended or adjusted under 35 U.S.C. 154(b) by 402 days.

(21) Appl. No.: 15/439,715

(22) Filed: Feb. 22, 2017

(65) Prior Publication Data

US 2017/0309877 A1    Oct. 26, 2017

(30) Foreign Application Priority Data

Apr. 21, 2016 (CN) .......................... 2016 1 0250992

(51) Int. Cl.
*H01M 2/10* (2006.01)
*H01M 10/04* (2006.01)

(52) U.S. Cl.
CPC ....... *H01M 2/1094* (2013.01); *H01M 2/1077* (2013.01); *H01M 10/0481* (2013.01); *H01M 2220/20* (2013.01)

(58) Field of Classification Search
CPC ......... H01M 10/0481; H01M 2220/20; H01M 2/1077; H01M 2/1094
See application file for complete search history.

(56) References Cited

U.S. PATENT DOCUMENTS

| 8,512,889 B1 | 8/2013 | Ahn |
| 2011/0197529 A1 | 8/2011 | Calisse |

(Continued)

FOREIGN PATENT DOCUMENTS

| CN | 205508915 U | 8/1916 |
| CN | 102209819 A | 10/2011 |

(Continued)

OTHER PUBLICATIONS

From EPO Application No. 16205886.1, European Search Report and Search Opinion dated Mar. 22, 2017.

(Continued)

*Primary Examiner* — Lingwen R Zeng
(74) *Attorney, Agent, or Firm* — Ladas & Parry, LLP (57) ABSTRACT

This application relates to a battery module, including a substrate, battery units, end plates, side plates and fastening pieces; the end plates are respectively located on two sides of the battery units in their stacking direction, adjacent to outermost ones of the battery units and extend along a length direction of the battery unit; an end of the end plate in the length direction is curled into a pipe and forms a curling pipe section, an axial direction of the curling pipe section is the same with a height direction of the battery unit; the fastening piece is inserted in the curling pipe section, extends in the curling pipe section toward the substrate and protrudes out of the curling pipe section, and are fixed on the substrate; by configuring curling pipe sections, fastening strength is improved, so as to realize reliable fixation of the battery module on the substrate.

9 Claims, 5 Drawing Sheets

(56) References Cited

U.S. PATENT DOCUMENTS

| | | |
|---|---|---|
| 2012/0107664 A1 | 5/2012 | Lee et al. |
| 2013/0052516 A1 | 2/2013 | Kim |
| 2013/0130078 A1 | 5/2013 | Schaefer et al. |
| 2013/0273404 A1 | 10/2013 | Ochi et al. |
| 2015/0004469 A1 | 1/2015 | Park et al. |
| 2015/0030894 A1 | 1/2015 | Lee et al. |
| 2015/0144409 A1 | 5/2015 | Fujii |
| 2016/0308178 A1* | 10/2016 | Petersen ............ H01M 2/1077 |

FOREIGN PATENT DOCUMENTS

| | | |
|---|---|---|
| CN | 102473978 A | 5/2012 |
| CN | 102598354 A | 7/2012 |
| CN | 103000835 A | 3/2013 |
| CN | 103295630 A | 9/2013 |
| CN | 104253252 A | 12/2014 |
| CN | 104347833 A | 2/2015 |
| CN | 204303901 U | 4/2015 |
| JP | 2012-181970 A | 9/2012 |
| JP | 2015-23003 A | 2/2015 |

OTHER PUBLICATIONS

From Chinese Application No. 2016102509922, Office Action dated Oct. 9, 2017 with English translation from Global Dossier.

* cited by examiner

BATTERY MODULE

CROSS-REFERENCE TO RELATED APPLICATIONS

The present application claims priority to Chinese Patent Application No. 201610250992.2, filed on Apr. 21, 2016, the content of which is incorporated herein by reference in its entirety.

TECHNICAL FIELD

The present application relates to the technical field of energy storage devices and, particularly, relates to a battery module.

BACKGROUND

After the power battery modules are installed on an electric vehicle, adverse external factors for the modules such as shaking and vibration and the like will occur to the electric vehicle during the driving process, if the battery modules are not fixed at a specific position, the battery modules are readily damaged due to the impact, collision and extrusion between the battery modules caused by relative displacement between the battery modules, over time the battery module performance will deteriorate or lose efficacy, in a severe case, safety accidents such as short circuit, fire and the like may occur to the battery modules. Usually, the end plate structure of the power battery module is an aluminum piece with through holes formed by extrusion, the end plate with through holes can make the battery modules be firmly fixed on a specific substrate like the battery module box through a fastening piece like the bolt, so as to reduce or even avoid the interactive mechanical action between the battery modules during the driving process, thereby improving the safety performance of the battery modules.

Additionally, the fixation of the existing end plate on the substrate usually adopts an additionally provided sleeve member, the sleeve member is provided with a through hole and fixed on the substrate by a bolt, and the end plate is welded on the sleeve member, thereby being jointly fixed on the substrate, thus the problem of mechanical weakness caused by the connection of different components cannot be avoided, the pressure resisting ability of the end plate fixed on the substrate is poor.

SUMMARY

The object of the present application is to provide a battery module which does not need additional connecting sleeve members, reduces the mechanical weakness problems caused by the connection of a plurality of components, and effectively enhances the rigidity and the pressure resisting ability of the end plate, so as to improve the working reliability of the battery module.

The specific solutions of the present application are as follows:

A battery module, including a substrate, a plurality of battery units, a pair of end plates, a pair of side plates and a plurality of fastening pieces;

the plurality of battery units are located on the substrate, and are stacked in sequence along a thickness direction of the battery unit;

the pair of end plates are respectively located on two sides of the plurality of battery units in their stacking direction, and are adjacent to outermost ones of the battery units and extend along a length direction of the battery unit; and an end of the end plate in the length direction of the battery unit is curled into a pipe and forms a curling pipe section, an axial direction of the curling pipe section is the same direction with a height direction of the battery unit;

the pair of side plates are respectively located on two sides of the plurality of battery units in the length direction of the battery unit, extend along the thickness direction of the battery unit, and are fixedly connected with the curling pipe section;

the fastening piece is inserted in the curling pipe section, extends in the curling pipe section toward the substrate and protrudes out of the curling pipe section, and are fixed on the substrate.

Preferably, the curling pipe section is located on a side of the end plate opposite to the battery unit.

Preferably, the side plate extends along the thickness direction of the battery unit until covering on the curling pipe section, and is welded and fixed with the curling pipe section.

Preferably, the curling pipe section includes, along a curve direction of curling, a curling pipe fixing end that is connected with a plate surface of the end plate and a curling pipe free end that is connected with the curling pipe fixing end; the curling pipe free end contacts with the plate surface of the end plate and is kept inside the pipe of the curling pipe section.

Preferably, the curling pipe free end contacts and is connected with the plate surface of the end plate, and at a contacting and connecting position, is abutted with the plate surface of the end plate and extends toward an outside of the pipe so as to form an extending section.

Preferably, the extending section is welded and fixed with the plate surface of the end plate with which the extending section is abutted.

Preferably, an end of the end plate in the height direction of the battery unit extends toward a side where the curling pipe section is located and forms an edge-wrapped section that wraps on the curling pipe section; the edge-wrapped section is provided with an opening on a position corresponding to a pipe hole of the curling pipe section; the fastening piece extends through the opening to the substrate, and is fixedly connected on the substrate.

Preferably, the curling pipe section and the edge-wrapped section are fixedly connected through welding.

Preferably, two ends of the end plate in the height direction of the battery unit are provided with a pair of the edge-wrapped sections; the edge-wrapped section includes an edge-wrapped fixing end that is connected with the plate surface of the end plate and an edge-wrapped free end that is connected with the edge-wrapped fixing end; a pair of edge-wrapped free ends of the edge-wrapped section respectively extend toward each other along an axial direction of the curling pipe section until being connected with each other, and form a firm connection between two edge-wrapped sections at a connecting position through welding.

Preferably, a material of the end plate and the side plate is stainless steel, magnesium alloy, galvanized steel or carbon steel.

The technical solutions of the present application further include an end plate structure formed from combination of structures of any one of the above curling pipe sections and any one of the above edge-wrapped sections.

The technical solutions provided by the present application can achieve the following beneficial effect:

(1) Since the curling pipe section and the end plate are an integral structure which does not need additional connecting sleeve members, the problem of poor intermediate mechanical properties caused by the connecting procedures of different components is avoided, moreover, since the curling pipe section is a curved-surface structure which helps to disperse the vertical pressure coming from the side plates, when confronting the external pressure, the end plate is more resistant of pressure.

(2) The curling pipe section on the end plate also plays a role as the ribbed plate, which increases the rigidity of the end plate, so as to prevent the end plate from deformation; the extending section of the curling pipe section is abutted and fixed with the end plate, which further increases the pressure bearing ability of the curling pipe section of the end plate;

(3) The edge-wrapped section can also increase the pressure bearing ability of the end plate, and the edge-wrapped section increases the integral thickness of the end plate, so that the end plate is furthermore resistant of pressure, which compared with a whole piece of end plate structure with the same thickness, lightens the end plate, thereby lightening the battery module, reducing the extra consumption of energy of the battery module during the driving process.

REFERENCE SIGNS 1, end plate;
2, side plate;
3, cell;
11, curling pipe section;
111, extending section;
12, edge-wrapped section;
121, welding seam;
122, opening;
123, welding seam;
11', plate with curling pipe section;
12', plate with edge-wrapped section;

x, thickness direction of cell;
y, length direction of cell.

DESCRIPTION OF EMBODIMENTS

In order to make the objects, technical solutions and advantages of the present application more clear, the technical solutions of the present application are clearly and completely described combining the embodiments and accompanying drawings of the present application, obviously, the embodiments described are merely a part of the embodiments of the present application but not all of the embodiments. Based on the technical solutions and the embodiments provided by the present application, all other embodiments obtained by persons skilled in the art without any creative efforts shall belong to the protection scope of the present application.

The "length", "width" and "height" in the disclosure refer to the placement state of the cell 3 (battery unit) in the drawings.

Figure 1:
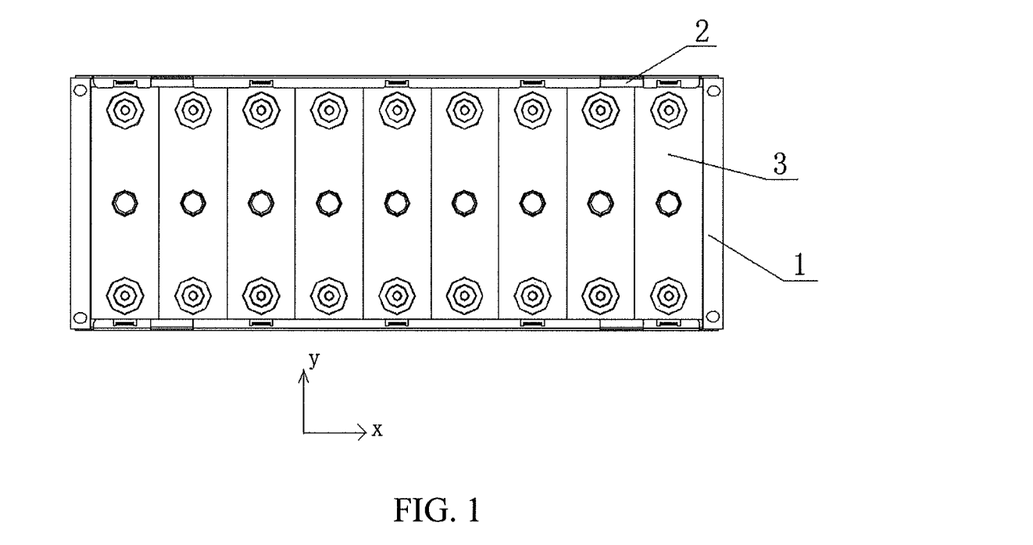
FIG. 1 is a top view of an integral structure of a battery module according to an embodiment of the present application.
Figure 2:
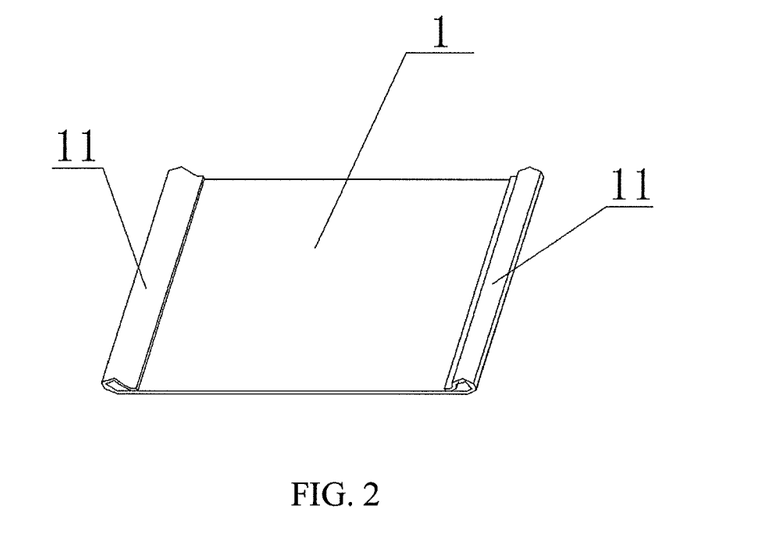
FIG. 2 is a structural view of an end plate with a curling pipe section according to an embodiment of the present application.

A battery module, as shown in FIG. 1, including a substrate (located at the bottom of the cell 3, not shown), a plurality of cells 3, a pair of end plates 1, a pair of side plates 2 and a plurality of fastening pieces;

the plurality of cells 3 are located on the substrate, and are stacked in sequence along the thickness direction of the cell 3;

the pair of end plates 1 are respectively located on the two sides of the plurality of cells 3 in their stacking direction, adjacent to the outermost ones of the cells 3 and extend along the length direction of the cell 3; and an end of the end plate 1 in the length direction of the plurality of batteries is curled into a pipe and forms a curling pipe section 11, the axial direction of the curling pipe section 11 is the same direction with the height direction of the cell 3, as shown in FIG. 2;

the pair of side plates 2 are respectively located on the two sides of the plurality of cells 3 in the length direction of the cell 3, extend along the thickness direction of the cell 3, and are fixedly connected with the curling pipe sections 11;

the fastening piece is inserted in the curling pipe section 11, extends toward the substrate in the curling pipe section 11 and protrudes out of the curling pipe section 11, and is fixed on the substrate.

The curling pipe section 11 of the present application is formed by extending and curling of the end plate 1, and is an integral structure with the end plate 1, the fixation between the end plate 1 and the substrate can be realized by inserting the fastening piece in the curling pipe section 11, therefore, there is no need of additional sleeve members configured for the connection between the end plate 1 and the substrate, so as to avoid the problem of poor intermediate mechanical properties caused by the connecting procedure of different components, besides, the integral curling pipe section 11 is a curved-surface structure which also helps to disperse the vertical pressure from the side plate 2, therefore, when confronting the external pressure, the pressure resisting ability of the connection with this structure is greater.

As an improvement of the present application, the two ends of each end plate 1 along the length direction of the plurality of batteries are provided with a pair of curling pipe sections 11.

As an improvement of the present application, the curling pipe section 11 is located on the side of the end plate 1 opposite to the cell 3. Thus, the curling pipe section 11 can play a role as a ribbed plate on the end plate 1, which can increase the rigidity of the end plate 1, so as to prevent the end plate 1 from expansion and deformation; if the curling pipe section 11 faces the cell, once the cell exerts force on the end plate 1 due to factors such as charging-discharging expansion of the battery module or vibration in actual working situations and the like, the force bearing position of the end plate 1 is the curling pipe section 11, which has a small force bearing area on the line tangent with the surface of the cell 3, causing that the local stress undertaken by the cell 3 is large, which readily damages the cell.

As an improvement of the present application, the side plate 2 extends along the thickness direction of the cell until covering on the curling pipe section 11, and is welded and fixed with the curling pipe section. The manners of welding and fixing can be laser welding, electric resistance welding, CMT welding, plasma-arc welding or high frequency welding with the end plate 1 to form firm connection.

As an improvement of the present application, the cross section of the curling pipe section 11 can be circular, elliptical or polygonal.

Figure 3:
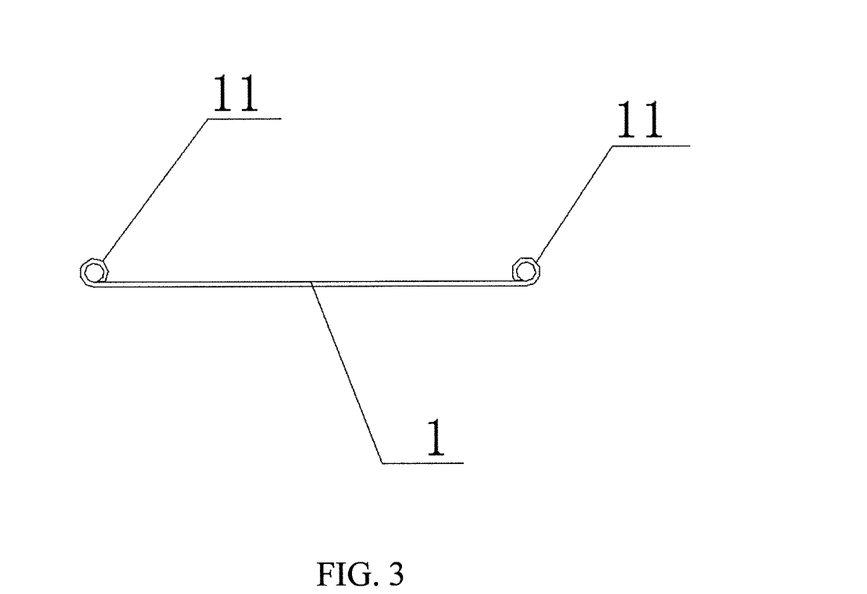
FIG. 3 is a sectional view of a curling pipe section of an end plate according to an embodiment of the present application.

As an improvement of the present application, the curling pipe section 11 includes, along the curve direction of curling, a curling pipe fixing end that is connected with the plate surface of the end plate 1 and a curling pipe free end that is connected with the curling pipe fixing end; the curling pipe free end contacts and is connected with the plate surface of the end plate 1 and is kept inside the pipe, as shown in FIG. 3.

Figure 4:
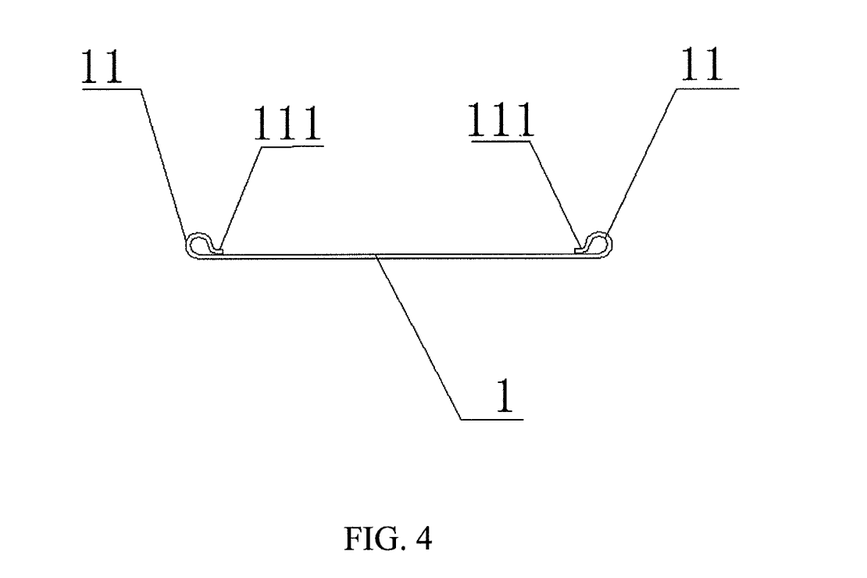
FIG. 4 is a sectional view of another curling pipe section of an end plate according to an embodiment of the present application.

As an improvement of the present application, the curling pipe free end contacts and is connected with the plate surface of the end plate 1, and at the contacting and connecting position, is abutted with the plate surface of the end plate 1 and extends toward the outside of the pipe so as to form an extending section 111, as shown in FIG. 4.

As an improvement of the present application, the extending section 111 is welded and fixed with the plate surface of the end plate 1 with which the extending section 111 is abutted. The manners of welding and fixing can be laser welding, electric resistance welding, CMT welding, plasma-arc welding or high frequency welding on the large plane of end plate 1 to form a firm connection.

The extending section 111 that is abutted with the end plate can be applied in the manufacture of battery modules with higher strength requirement, the added welding process such as laser welding, high frequency welding and so on can make the curling pipe section 11 be firmly fixed on the end plate 1, so that the curling pipe section 11 can bear greater force after being locked with the bolt. The extending section 111 in the meantime works as a supporting point of the curling pipe section 11, when there is external force pressing toward the curling pipe section 11, the extending section 111 will play a supporting role, so as to make the curling pipe section 11 more resistant of pressure.

Figure 7:
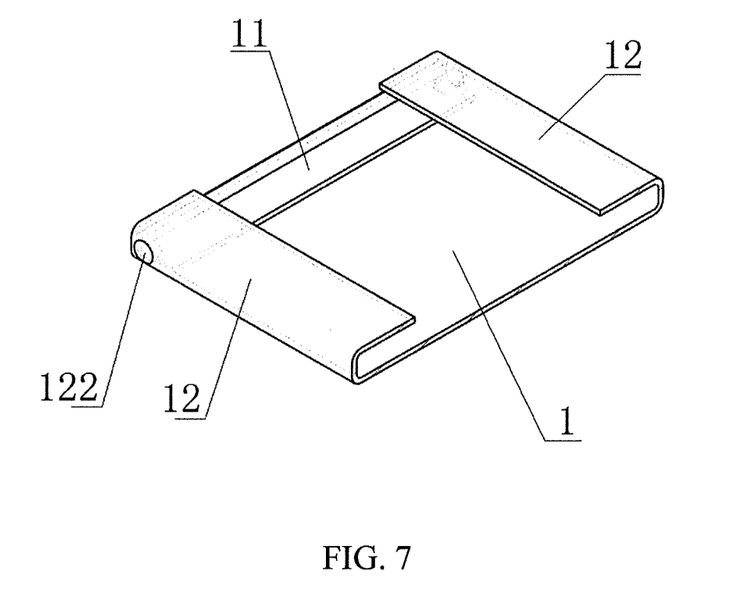
FIG. 7 is a structural view of B-B section of the end plate in FIG. 5.
Figure 8:
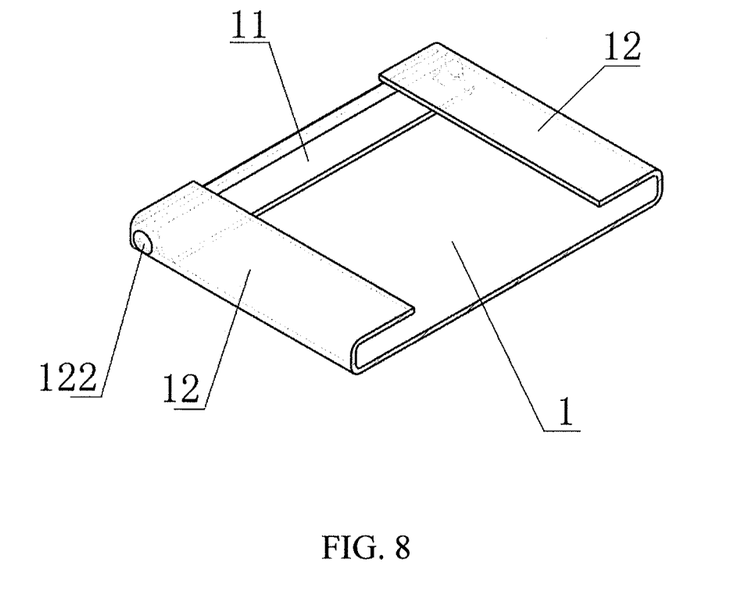
FIG. 8 is a structural view of another end plate with a curling pipe section and an edge-wrapped section according to an embodiment of the present application.

As an improvement of the present application, the end of the end plate 1 in the height direction of the cell 3 extends toward a side where the curling pipe section 11 is located and forms an edge-wrapped section 12 that wraps on the curling pipe section 11; the edge-wrapped section 12 is provided with an opening 122 on a position corresponding to the pipe hole of the curling pipe section 11; as shown in FIG. 7 and FIG. 8; the fastening piece extends through the opening 122 to the substrate, and is fixedly connected on the substrate. The edge-wrapped section 12 has a similar function with the curling pipe section 11, which can increase the pressure resistance of the end plate 1, except that the force bearing direction is different from that of the curling pipe section 11; and the additionally provided edge-wrapped section 12 also helps to increase the integral thickness of the end plate 1, so that the end plate 1 will be furthermore resistant of pressure in the thickness direction, which compared with a whole piece of end plate 1 with the same thickness, helps to lighten the end plate, thereby lightening the battery module, reducing the extra consumption of energy of the battery module during the driving process.

As an improvement of the present application, the cross section of the curling pipe section 11 is circular, the opening 122 is a circular hole, the fastening piece used is a fastening bolt that is fitted to both the pipe hole of the curling pipe section 11 and the opening 122, the fastening bolt is fastened in the pipe of the curling pipe section 11.

Figure 5:
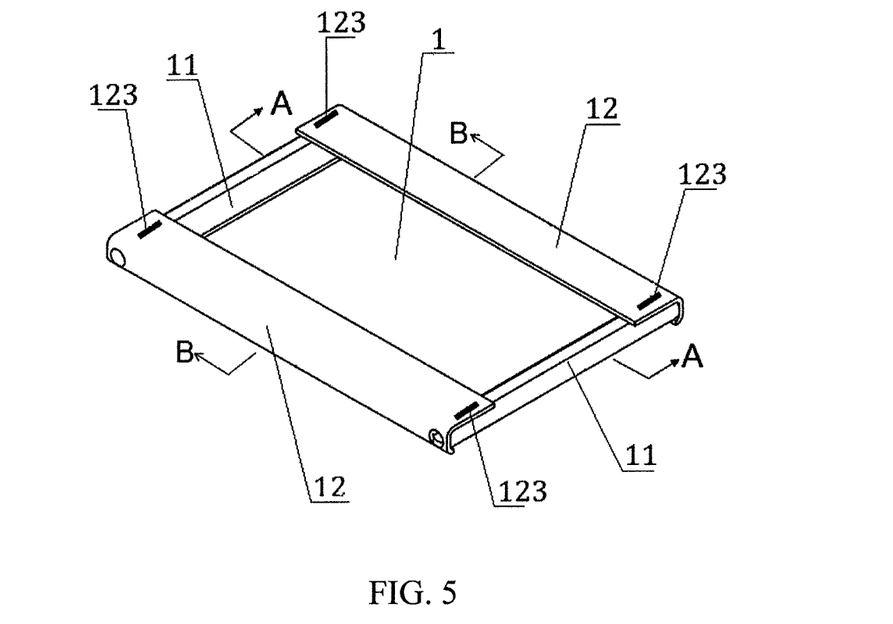
FIG. 5 is a structural view of an end plate with a curling pipe section and an edge-wrapped section according to an embodiment of the present application.
Figure 6:
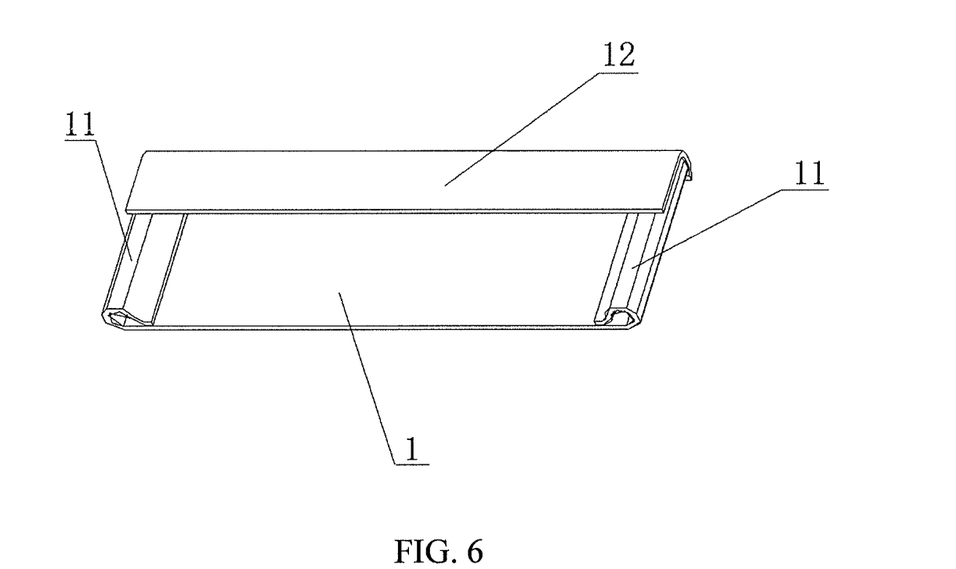
FIG. 6 is a structural view of A-A section of the end plate in FIG. 5.

As an improvement of the present application, the curling pipe section 11 and the edge-wrapped section 12 are fixedly connected through welding. The curling pipe section 11 and the edge-wrapped section 12 can be welded together and form a firm connection by laser welding, electric resistance welding, CMT welding, plasma-arc welding or high frequency welding. As shown in FIG. 5.

As an improvement of the present application, as shown in FIG. 8, the two ends of the end plate 1 in the height direction of the cell 3 are provided with a pair of edge-wrapped sections 12; the edge-wrapped section 12 includes an edge-wrapped fixing end that is connected with the plate surface of the end plate 1 and an edge-wrapped free end that is connected with the edge-wrapped fixing end; a pair of edge-wrapped free ends of the edge-wrapped section 12 respectively extend toward each other along the axial direction of the curling pipe section 11 until being connected with each other, and form firm connection at the connecting position of the two edge-wrapped sections 12 through welding. The welding herein can be laser welding, electric resistance welding, CMT welding, plasma-arc welding or high frequency welding, etc.

Figure 9:
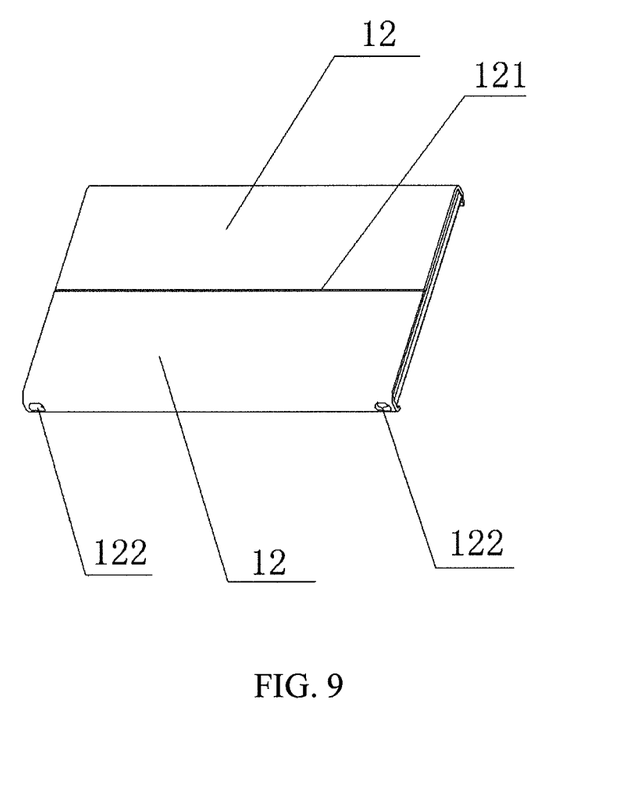
FIG. 9 is a spread schematic view of a plate of an end plate with a curling pipe section and an edge-wrapped section according to an embodiment of the present application.

As a further illustration of the above technical solutions of the present application, as shown in FIG. 9, the connection between the curling pipe section 11 and the end plate 1 to which the curling pipe section 11 belongs is continuous; the connection between the edge-wrapped section 12 and the end plate 1 to which the edge-wrapped section 12 belongs is continuous. That is to say, the curling pipe section 11 and the end plate 1 are an integral structure, the edge-wrapped section 12 and the end plate 1 are an integral structure, which helps to avoid the problem of poor intermediate mechanical properties caused by the connecting procedures of different components, and achieve a large number of automatic production.

As an improvement of the present application, the end plate 1 and the side plate 2 use plates of the same material, and a plate with a strength of more than 200 MPa is preferably selected, such as stainless steel, magnesium alloy, galvanized steel, carbon steel and so on.

As an improvement of the present application, the curling pipe section 11 and the edge-wrapped section 12 of the end plate 1 are machined by rolling, coiling, curling, stamping or the like.

The technical solutions of the present application further include a combination of any one of the above edge-wrapped sections 12 and any one of the above curling pipe sections 11.

Although the present application is disclosed with the above-mentioned preferred embodiments, however, they are not used to limit the claims; any person skilled in the art, within the conception of the present application, can make a variety of possible variations and modifications, therefore the protection scope of the present application shall be subject to the scope defined by the claims of the present application.

What is claimed is:

1. A battery module, comprising a substrate, a plurality of battery units, a pair of end plates, a pair of side plates and a plurality of fastening pieces; wherein,
   the plurality of battery units are located on the substrate, and are stacked in sequence along a thickness direction of the battery unit;
   the pair of end plates are respectively located on two sides of the plurality of battery units in their stacking direction, and are adjacent to outermost ones of the battery units and extend along a length direction of the battery unit; and an end of the end plate in the length direction of the battery unit is curled into a pipe and forms a curling pipe section, an axial direction of the curling pipe section is the same direction with a height direction of the battery unit;
   the pair of side plates are respectively located on two sides of the plurality of battery units in the length direction of the battery unit, extend along the thickness direction of the battery unit, and are fixedly connected with the curling pipe section;
   the fastening piece is inserted in the curling pipe section, extends in the curling pipe section toward the substrate and protrudes out of the curling pipe section, and are fixed on the substrate,
   wherein, an end of the end plate in the height direction of the battery unit extends toward a side where the curling pipe section is located and forms an edge-wrapped section that wraps on the curling pipe section; the edge-wrapped section is provided with an opening on a position corresponding to a pipe hole of the curling pipe section; the fastening piece extends through the opening to the substrate, and is fixedly connected on the substrate.

2. The battery module according to claim 1, wherein, the curling pipe section is located on a side of the end plate opposite to the battery unit.

3. The battery module according to claim 2, wherein, the side plate extends along the thickness direction of the battery unit until covering on curling pipe section, and is welded and fixed with the curling pipe section.

4. The battery module according to claim 2, wherein, the curling pipe section includes, along a curve direction of curling, a curling pipe fixing end that is connected with a plate surface of the end plate and a curling pipe free end that is connected with the curling pipe fixing end; the curling pipe free end contacts with the plate surface of the end plate and is kept inside the pipe of the curling pipe section.

5. The battery module according to claim 4, wherein, the curling pipe free end contacts and is connected with the plate surface of the end plate, and at a contacting and connecting position, is abutted with the plate surface of the end plate and extends toward an outside of the pipe so as to form an extending section.

6. The battery module according to claim 5, wherein, the extending section is welded and fixed with the plate surface of the end plate with which the extending section is abutted.

7. The battery module according to claim 1, wherein, the curling pipe section and the edge-wrapped section are fixedly connected through welding.

8. The battery module according to claim 1, wherein, two ends of the end plate in the height direction of the battery unit are provided with a pair of the edge-wrapped sections; the edge-wrapped section comprises an edge-wrapped fixing end that is connected with the plate surface of the end plate and an edge-wrapped free end that is connected with the edge-wrapped fixing end; a pair of edge-wrapped free ends of the edge-wrapped section respectively extend toward each other along an axial direction of the curling pipe section until being connected with each other, and form a firm connection between two edge-wrapped sections at a connecting position through welding.

9. The battery module according to claim 1, wherein, a material of the end plate and the side plate is stainless steel, magnesium alloy, galvanized steel or carbon steel.

* * * * *